United States Patent [19]
Touriguian et al.

[11] Patent Number: 5,832,257
[45] Date of Patent: Nov. 3, 1998

[54] DIGITAL SIGNAL PROCESSING METHOD AND SYSTEM EMPLOYING SEPARATE PROGRAM AND DATA MEMORIES TO STORE DATA

[75] Inventors: Mihran Touriguian, Hercules, Calif.; Gerhard Fettweis, Dresden, Germany; Ingrid Verbauwhede, Berkeley, Calif.

[73] Assignee: Atmel Corporation, San Jose, Calif.

[21] Appl. No.: 581,431

[22] Filed: Dec. 29, 1995

[51] Int. Cl.$^6$ ............................................. G06F 9/00
[52] U.S. Cl. ................................. 395/561; 395/800.35
[58] Field of Search ........................... 395/566, 800.33, 395/561, 800.35; 711/3, 5, 125, 150, 153

[56] References Cited

U.S. PATENT DOCUMENTS

| | | | |
|---|---|---|---|
| 4,896,264 | 1/1990 | Boddie | 711/3 |
| 5,212,780 | 5/1993 | Padgaonkar et al. | 711/5 |
| 5,301,295 | 4/1994 | Leary et al. | 711/125 |
| 5,577,230 | 11/1996 | Argade et al. | 711/150 |
| 5,611,075 | 3/1997 | Garde | 711/153 |
| 5,685,005 | 11/1997 | Garde et al. | 395/800.36 |

OTHER PUBLICATIONS

Papamichalis et al., The TMS320C30 Floating Point Digital Signal Processor, IEEE, pp. 13–29, Dec. 1988.
TMS32010 User's Guide, Digital Signal Processor Products, Texas Instruments, pp. 1–1, 1–5, 2–1 thru 2–4, 2–7, 3–1, A–1, A–4, A–5, Aug. 1992.
Newspaper article—Ashhok Bindra, "Two Lode up on TCSI's new DSP core," Electronic Engineering Times, Jan. 16,1995, pp. 1 and 12.
Buyer's Guide to DSP Processors, Berkeley Design Technology, Inc. 1995, title page and pp. 653–659.

Primary Examiner—Richard L. Ellis
Assistant Examiner—Patrice L. Winder
Attorney, Agent, or Firm—Thomas Schneck; George B.F. Yee; John P. McGuire, Jr.

[57] ABSTRACT

A digital signal processing system for executing instructions and processing data, including a program memory which stores the instructions and a first portion of the data, a data memory which stores a second portion of the data, and a program control unit connected to the program memory for receiving a sequence of the instructions and generating control signals for executing the instructions, wherein the program control unit is programmed to fetch at least one data value from the program memory in response to at least one of the instructions. Preferably, the system also includes a memory management unit connected to the program control unit and the data memory for generating address signals in response to at least one of the control signals for use in reading data values from the data memory. In preferred embodiments of the method of the invention, a digital signal processor (having a program memory which stores instructions and data and a physically separate data memory which stores data) generates control bits for controlling a read of data from the data memory in response to a first instruction from the program memory, and fetches data from the program memory in response to a second instruction from the program memory.

27 Claims, 4 Drawing Sheets

1 data is fetched by PCU
1 data is fetched by AGU

DIGITAL SIGNAL PROCESSING METHOD AND SYSTEM EMPLOYING SEPARATE PROGRAM AND DATA MEMORIES TO STORE DATA

1. Field of the Invention

The present invention relates to methods for operating a digital signal processor having a program memory physically separate from a data memory, and to a digital signal processor programmed to implement such a method.

2. Background of the Invention

Many different implementations of a digital signal processor (DSP) are well known in the art. A conventional DSP typically includes at least one multiply and accumulate (MAC) unit since, for many signal processing applications the operations of multiplication and addition (accumulation) are frequently used, and an appropriately designed MAC unit (implemented as hardwired circuitry) can perform such operations efficiently.

A conventional DSP typically also employs two physically separate memory units: a program memory for storing instructions to be executed by the DSP; and a data memory for storing data to be processed (and optionally also data that has been processed) by the DSP as a result of executing the instructions. The program memory can be a read-only memory (ROM) or a random access memory (RAM) to which data can be written and from which data can be read. The data memory is typically a RAM to which data can be written and from which data can be read.

FIG. 1 is a block level diagram of a digital signal processor (DSP) having a program memory and a data memory physically separate from the program memory, of the type which can be programmed to implement the present invention. The DSP of FIG. 1 includes data memory 6 (connected to address buses AB0 and AB1 and to data buses DB0 and DB1), program memory 4, program control unit (PCU) 2, memory management unit (MMU) 3, arithmetic computational unit (ACU) 10, and input/output unit (IOU) 12.

In implementations preferred for some applications (such as that to be described with reference to FIG. 2), program memory 4 is a single port, read-only memory (ROM) with an array of storage locations 32 bits wide and 64K words deep, and data memory 6 is a dual port, random-access memory (RAM) with an array of storage locations 16 bits wide and 64K words deep. In such implementations, one port of dual port memory 6 can receive a 16-bit address (from 16-bit address bus AB0) and at the same time, the other port of memory 6 can receive another 16-bit address (from 16-bit address bus AB1). Control means are provided so that two simultaneous reads from memory 6, a simultaneous read from and write to memory 6, or a single read from (or write to) memory 6 can be performed.

MMU 3 preferably includes two independent address generation units for generating two address signals (each identifying a memory location in memory 6 for writing data to or reading data from) and asserting such address signals to address buses AB0 and AB1. More specifically, in response to control bits from PCU 2 (which have been generated in PCU 2 by decoding instructions from program memory 4), MMU 3 asserts address signals on address bus AB0 and/or address bus AB1. Data is read from the memory location (in memory 6) identified by each address into pipeline register M0 or pipeline register M1 (or data is written from data bus DB0 and/or data bus DB1 into the memory location identified by each address).

Preferably MMU 3 includes a set of eight address pointer registers (each for storing a 16-bit address which can be asserted to bus AB0 or AB1), an 8-bit pointer modifier register for each address pointer register, and a 16-bit adder for adding the contents of any selected address pointer register with the contents of a corresponding pointer modifier register, and writing the result of this addition back into the address pointer register (in response to control bits from PCU 2). Preferably, MMU 3 also includes other registers for use in modifying the contents of selected ones of the address pointer registers and pointer modifier registers in response to control bits from PCU 2.

In the DSP of FIG. 1, each of first data bus DB0 and second data bus DB1 is preferably 16 bits wide. In variations on the FIG. 1 system, a DSP programmed to implement the invention can have a single port data memory (rather than a dual port data memory), and single address bus and a single data bus (rather than dual address buses and dual data buses).

PCU 2 (a preferred implementation of which will be described below with reference to FIG. 3) includes instruction fetch means (for fetching instructions from program memory 4), an instruction decode unit, and registers for storing control bits generated in the decode unit (for assertion to MMU 3, data bus DB0, or the instruction fetch means).

Arithmetic computational unit (ACU) 10 preferably includes two Multiply and Accumulate (MAC) units which operate in parallel (in response to control bits from PCU 2) and an arithmetic manipulation unit which operates in parallel with the MAC units (in response to control bits from PCU 2).

IOU 12 includes means for monitoring the addresses on address buses AB0 and AB1 to determine the type of memory access being implemented. IOU 12 sets a flag to PCU 2 if the addresses are outside a predetermined address range (e.g., addresses for an external memory, other than memory 6, accessible through a port connected along bus AB0 and/or AB1). PCU 2 can assert wait states for slower memory accesses in response to such flags.

The present invention is desirably implemented in a DSP for use in communications operations. For example, it is contemplated that in a preferred embodiment, the DSP of FIG. 1 is programmed to implement the invention, and this programmed processor (identified as processor 100 in FIG. 2) is then included in a mobile digital telephone system of the type shown in FIG. 2. In the FIG. 2 system, serial port SIO of DSP 100 receives digitized speech from audio codec unit 106, and DSP 100 sends digital audio data (via port SIO) to codec unit 106 for conversion to analog form and then transmission to a loudspeaker. DSP 100 is also connected through analog front end circuit 104 to an RF transceiver 108. Circuit 104 includes means for digitizing a received signal from transceiver 108 (for baseband processing by means within DSP 100), and for converting digital data from DSP 100 into a continuous analog signal for transmission by transceiver 108. In typical implementations, circuit 104 would interrupt DSP 100 to indicate a request for or a presence of data (and circuit 104 is mapped into a memory address of DSP 100 so that circuit 104 can efficiently communicate over one of the data buses within DSP 100). Microcontroller 102 supplies control signals to all other elements of the FIG. 2 system and controls the communication protocol between the FIG. 2 system (which is typically a mobile station) and a remote base station. Typically, microcontroller 102 would be connected to a parallel port (PIO) of DSP 100.

The use of physically separate program and data memories in conventional digital signal processing systems (with program memory address generation performed by a program control unit, and data memory address generation performed by a separate memory management unit) allows pipelining of instructions in the sense that a next instruction can be loaded from the program memory while at the same time data can be loaded from the data memory. However, in this dual memory architecture, the data memory is typically implemented as a relatively complex RAM having large storage capacity (or an even more complex memory having both RAM and ROM elements). For some applications (e.g., those in which a relatively small number of data values are repeatedly processed during execution of some of the instructions), it would be desirable to implement the data memory as a smaller capacity and/or less complex memory, without significantly increasing the required complexity and storage capacity of the program memory. The present invention achieves this objective by allowing some of the data to be placed in the program memory (which is typically a ROM).

For applications in which data ROM requirements are small (e.g., when only a small number of frequently used coefficient values need be stored in a ROM), the invention allows use of a data memory of the type which does not include ROM circuitry (by placing the data to be stored in ROM in a program memory implemented as a ROM). This is an important advantage since it is typically complex and costly to implement ROM circuitry (along with RAM circuitry) in a data memory. Alternatively, the invention can allow use of a data memory having a small ROM portion (e.g., for storing a low number of coefficient values) as well as a RAM portion, where a data memory having a larger ROM portion would be required without the invention.

The present invention is useful to improve a conventional DSP having the architecture known in the art as "true Harvard" architecture (to be described briefly with reference to FIG. 6), and thereby to implement an improved system which has the same architecture. But, the invention is not useful to improve a DSP having the alternative architecture shown in FIG. 7. The DSP of FIG. 6 has the true Harvard architecture, since it has separate data and program memories, a program address generation means (within the PCU), and a data memory address generation means (AGU0 for the Data ROM portion of the data memory; AGU1 for the RAM portion of the data memory) separate from the program address generation means. Conventional DSPs having the FIG. 6 architecture have included means for asserting bits from the program memory to the data bus (e.g., bits which are a subset of the bits comprising one instruction fetched from the program memory). However, they have not been designed and programmed to fetch (and route to the data bus) data values (e.g., a sequence of coefficients for use in executing a multiply and accumulate operation) from the program memory in a manner eliminating the need for a ROM portion of their data memory. One aspect of the present invention is an implementation of a DSP having the FIG. 6 architecture which is designed and programmed to read a sequence of pairs of data values from the data memory in response to a single instruction of one kind, and to read a sequence of the following kind in response to a single instruction of another kind: a first pair consisting of one data value read from the data memory and one data value fetched from the program memory, followed by a second pair consisting of one data value read from the data memory and one data value fetched from the program memory, and so on.

In contrast, the conventional architecture of FIG. 7 includes a data memory (identified as "data RAM" in FIG. 7), a ROM which stores a program and also data, a data memory address generation means (AGU), and a second address generation means (within unit PCU). The second address generation means can either fetch data from the ROM or from the data memory. The data memory address generation means can read data only from the data memory. A program control means (also within unit PCU) decodes program instructions from the ROM.

SUMMARY OF THE INVENTION

A preferred embodiment of the invention is a digital signal processing system for executing instructions and thereby processing data, including a program memory which stores the instructions and a first portion of the data, a data memory which stores a second portion of the data, and a program control unit connected to the program memory for receiving and processing a sequence of the instructions to generate control signals for controlling operation of the system in response to the instructions. The program control unit is programmed to fetch at least one data value from the program memory in response to at least one of the instructions (or to receive at least one data value from the program memory along with at least one of the instructions). Preferably, the system also includes a memory management unit connected to the program control unit and the data memory for generating address signals in response to at least one of the control signals for use in reading data values from the data memory.

In preferred embodiments, the program control unit includes a program counter register from which instruction address bits are asserted to the program memory, one or more registers for receiving bits (which can be either data bits or instruction bits) read from the program memory in response to these address bits, and logic circuitry for receiving and processing instruction bits received from the program memory. The logic circuitry directs data bits received from the program memory to a data bus (typically in response to a previously received "program memory data instruction" from the program memory), and decodes instruction bits received from the program memory (to generate control bits for controlling operation of the system, such as control bits for controlling a read of data from the data memory). For example, a program memory data instruction received from the program memory can indicate to the logic circuitry that the next "N" words to be received from the program memory (where N is an integer) are data values that should be passed to the data bus (for processing by means connected along the data bus), and that the "(N+1)th" word to be received from the program memory is an instruction that should be decoded (rather than being passed to the data bus).

Another aspect of the invention is a method of operating a digital signal processor having a program memory which stores the instructions and a first portion of a quantity of data, a data memory which stores a second portion of the data, and a program control unit connected to the program memory for receiving a sequence of the instructions and generating control signals in response to the instructions. In a class of preferred embodiments, the method includes the steps of: generating control bits for controlling a read of data from the data memory in response to a first instruction from the program memory, and fetching data from the program memory in response to a second instruction (an instruction of the type denoted herein as a "program memory data" instruction) from the program memory.

DETAILED DESCRIPTION OF THE PREFERRED EMBODIMENT

Figure 1:
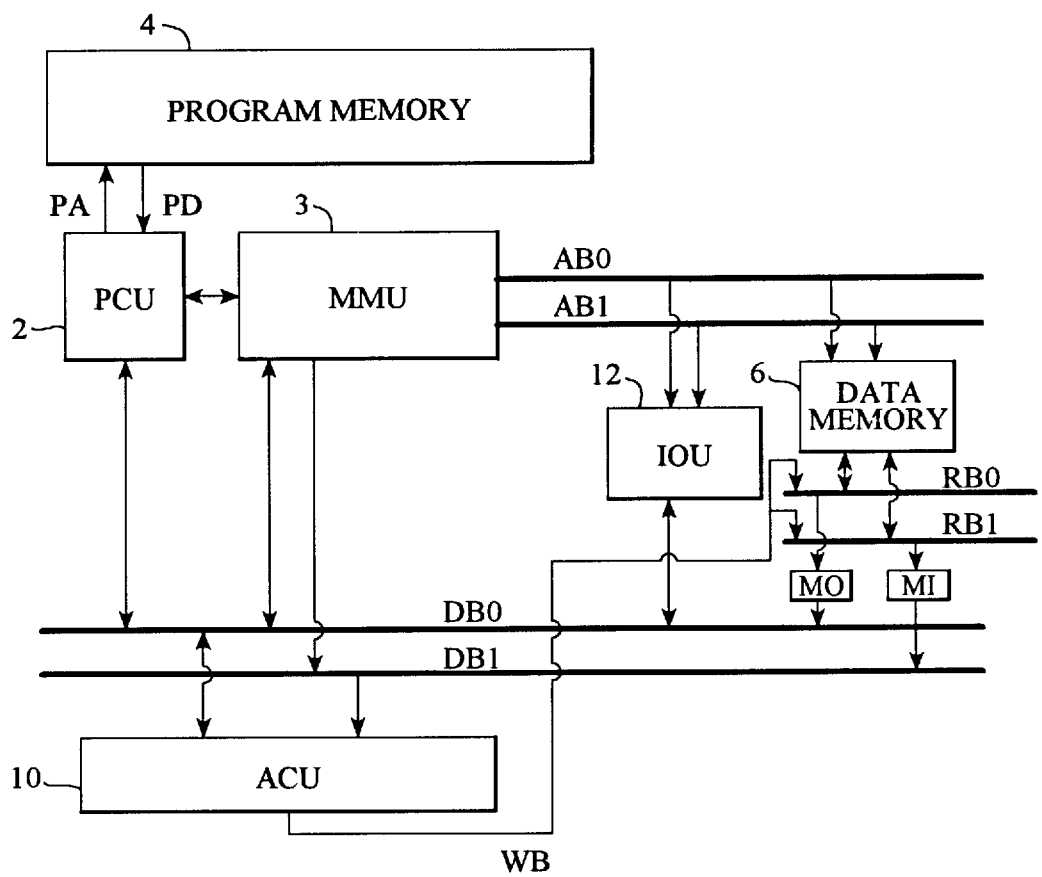
FIG. 1 is a schematic block level diagram of a digital signal processing system (DSP) which includes a program memory and a data memory.
Figure 2:
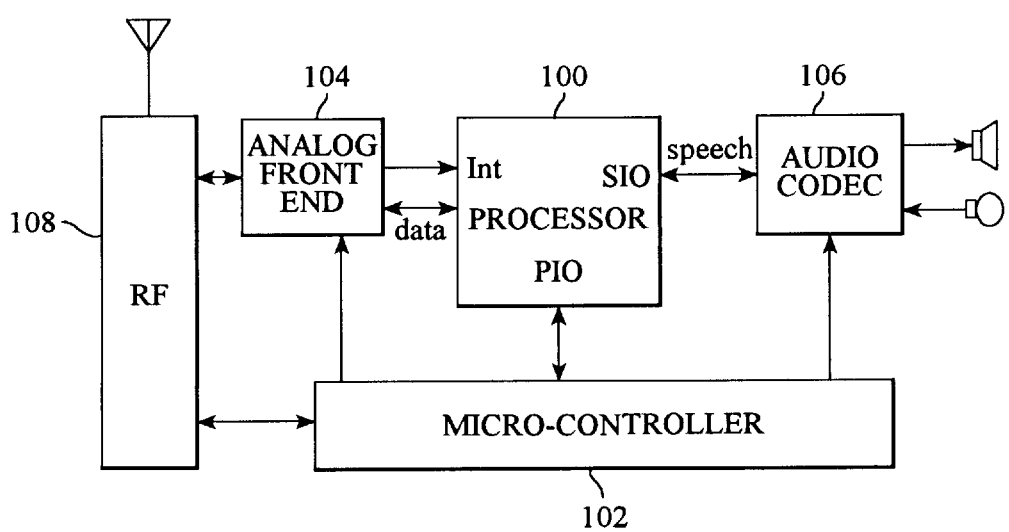
FIG. 2 is a schematic block level diagram of a mobile digital telephone system which includes the DSP of FIG. 1.

In a preferred embodiment, the present invention is implemented in a digital signal processor (DSP) of the type described herein with reference to FIGS. 1, 3, 4, and 5 (which can be included in a system of the type shown in FIG. 2). Additional aspects of such DSP are described in U.S. Pat. Applications entitled "Digital Signal Processing Method and System Implementing Zero Overhead Nested Loops" by K. Gupta, M. Touriguian, I. Verbauwhede, and H. Neff (Attorney Docket No. TEKN-6000)now U.S. Pat. No. 5,710,913, "Digital Signal Processing Method and System Implementing Pipelined Read and Write Operations" by I. Verbauwhede and G. Fettweis (Atty Docket No. TEKN-6100) now U.S. Pat. No. 5,710,914, and "Circuit for Rotating, Left Shifting, or Right Shifting Bits" by J. Muwafi, G. Fettweis, and H. Neff (Attorney Docket No. TEKN-6300)application 08/581,047 now pending, all filed on the same day as the present application and assigned to the assignee of the present application, the disclosures of which are incorporated herein in full by reference.

Figure 3:
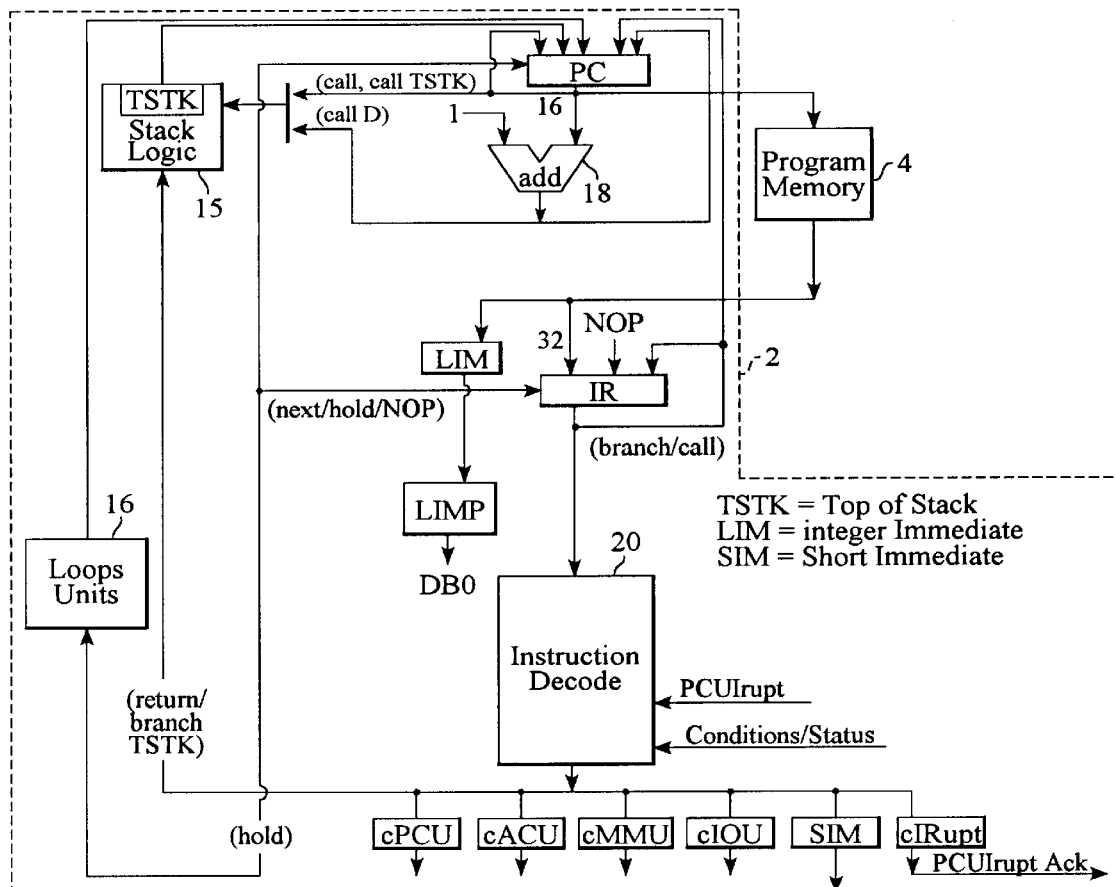
FIG. 3 is a schematic block level diagram of a preferred implementation of the program control unit of the DSP of FIG. 1 (which is programmed to implement the invention).

FIG. 3 is a diagram of a preferred implementation of program control unit 2 (PCU 2) of the DSP, which is programmed to implement the invention. PCU 2 of FIG. 3 receives (at instruction register IR) a sequence of 32-bit instructions from program memory 4, generates control signals for controlling execution of the instructions, and stores the control signals in selected ones of registers cPCU, cACU, cMMU, cIOU, and cIRupt.

In accordance with the invention, each 32-bit word stored in program memory 4 can be either an instruction, or a data value to be processed in accordance with one or more instructions. PCU 2 of FIG. 3 is programmed (in a manner to be described below) to fetch at least one data value from program memory 4 in response to at least one instruction it receives from program memory 4 (or to receive at least one data value from program memory 4 along with at least one of the instructions).

As shown in FIG. 3, PCU 2 includes program counter register PC for storing a sequence of 16-bit instruction addresses (for use in addressing program memory 4), and instruction register IR for receiving a 32-bit word (either a data value or an instruction) read from program memory 4 in response to each instruction address asserted from register PC to memory 4. In executing a program comprising a sequence of instructions, PCU 2 loads a sequence of 16-bit instruction addresses into register PC for addressing program memory 4, and instruction register IR (and/or below-discussed register LIM) receives a sequence of 32-bit words (each of which is either a data value or an instruction) from program memory 4 (memory 4 asserts one 32-bit word to register IR or register LIM in response to each 16-bit instruction address asserted from register PC to memory 4).

PCU 2 also includes instruction decode unit 20 which includes logic circuitry for receiving and processing 32-bit words from instruction register IR. In response to a distinctive instruction (denoted herein as a "program memory data" instruction) received from register IR, unit 20 treats bits fetched from program memory 4 as data values (rather than as instructions) in the sense that unit 20 causes these bits to be written directly to a register (e.g., register LIM) and then to data bus DB0 (e.g., for processing in ACU 10). Preferably, data bits in register LIM are copied to another register LIMP before being transferred to bus DB0. In response to each word in register IR other than a data value designated by a program memory data instruction, unit 20 decodes such word to generate therefrom a set of control bits for controlling operation of the system (e.g., control bits which are asserted from unit 20 to register cMMU, and then from register cMMU to MMU 3 for use in controlling a read of data from data memory 6).

PCU 2 of FIG. 3 also includes stack logic 15 (including "top of stack" register TSTK), adder 18, and loop unit 16.

Each time register PC asserts an instruction address to program memory 4 (during each "fetch" cycle of the pipelined operation to be described below), adder 18 increments this instruction address (by adding "1" thereto). The incremented address asserted at the output of adder 18 can be asserted directly to register PC or to stack logic 15. In one operating mode, the incremented address is asserted from adder 18 to register PC. In another operating mode, the register PC is updated with the contents of register TSTK (rather than with the output of adder 18).

Stack logic 15 implements a sixteen level deep hardware last-in-first-out (LIFO) stack for execution of program calls and returns for subroutine branching. A stack pointer selects which one of the sixteen registers is accessed A read from register TSTK (to register PC) pops the stack, and a write to register TSTK pushes a return address into the stack. At appropriate times during execution of a sequence of instructions from memory 4, the incremented address from adder 18 is written to top of stack register TSTK (so that the incremented address is the next address loaded to program counter register PC).

When implementing the five stage instruction pipeline described below with reference to FIG. 4, it takes two cycles to execute a program branch as follows. During a fetch cycle, a branch instruction is fetched from memory 4 and saved in register IR. Then, in the decode cycle, unit 20 decodes the instruction in register IR and the branch address is placed in register PC to cause the program to branch to the new address. If the instruction is a call instruction, in the same cycle, the return address is pushed into a location in the stack pointed to by an incremented value of the stack pointer. Then, when a return from a subroutine occurs, the contents of this location are loaded (i.e., the return address) into register PC and the stack pointer is decremented.

Loop unit 16 includes logic circuitry for executing a group of instructions a pre-specified number of times, in response to control bits generated by unit 20 (which can be stored in register cPCU and then asserted from register cPCU to unit 16). Preferably, initialization of unit 16 is performed independently from operation of unit 16 (to execute looped instructions) so that initialization need not be performed in response to initialization bits which immediately precede the instructions to be looped. Also preferably, unit 16 is designed so it requires neither a special "start of loop" instruction at the beginning of the group of instructions to be looped nor a special "dedicated branch" instruction at the end of such group of instructions. The above-cited U.S. Pat. Application entitled "Digital Signal Processing Method and System Implementing Zero Overhead Nested Loops" by K. Gupta, et al. (Attorney Docket No. TEKN-6000)now U.S. Pat. No. 5,710,913, filed on the same day as the present application, describes a preferred implementation of loop unit 16.

Figure 4:
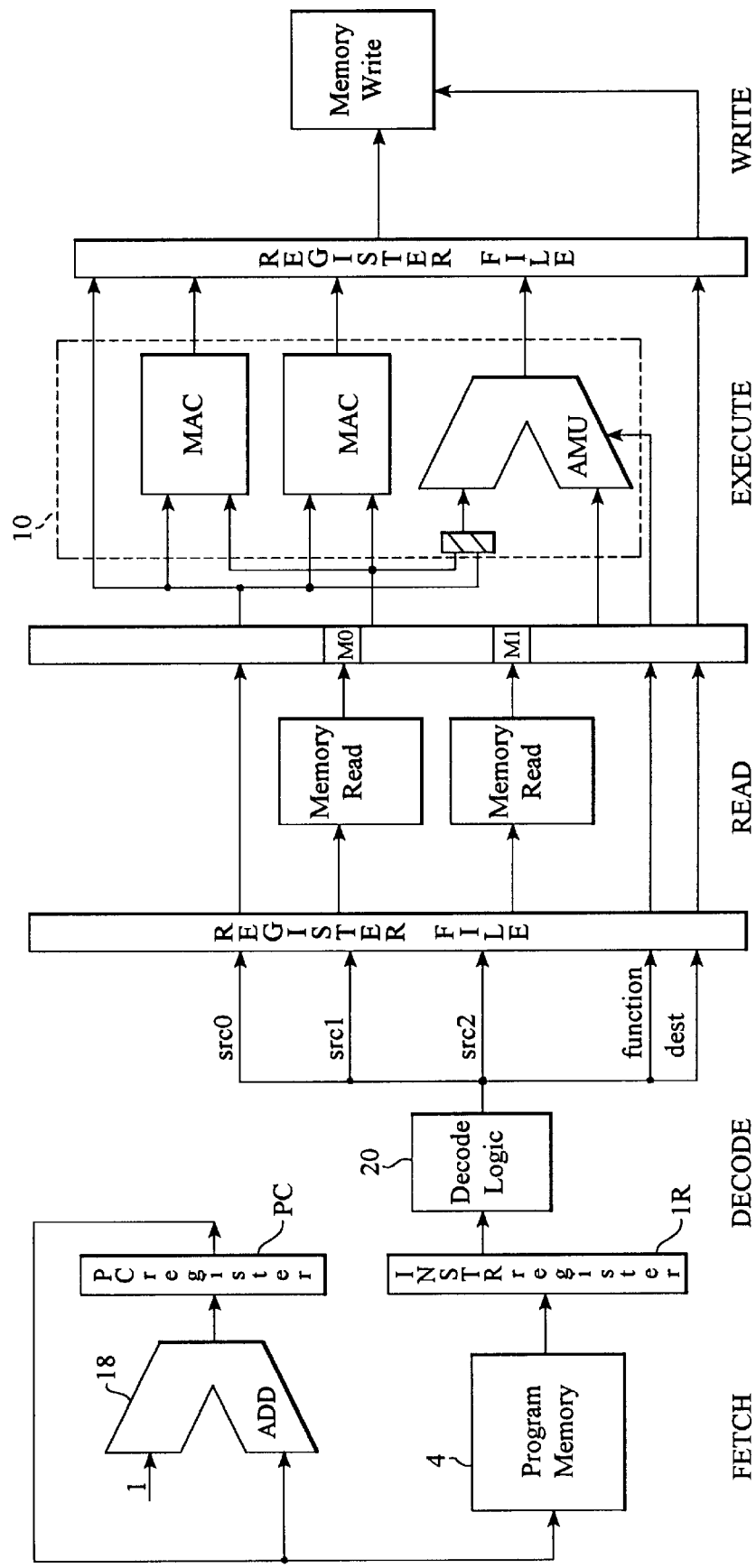
FIG. 4 is a diagram of the pipelined manner in which the DSP of FIGS. 1 and 3 preferably executes a sequence of instructions from program memory 4.
Figure 6:
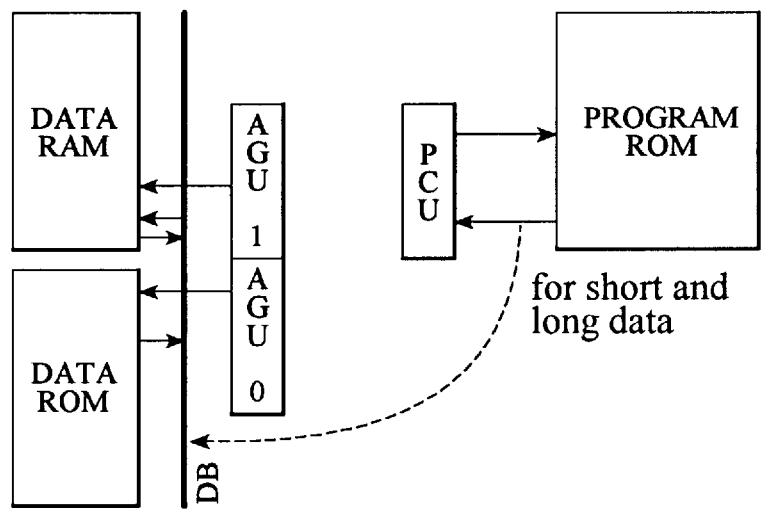
FIG. 6 is a block level diagram of a conventional DSP having the architecture known in the art as "true Harvard" architecture to which the improvement of the present invention may be utilized.
Figure 7:
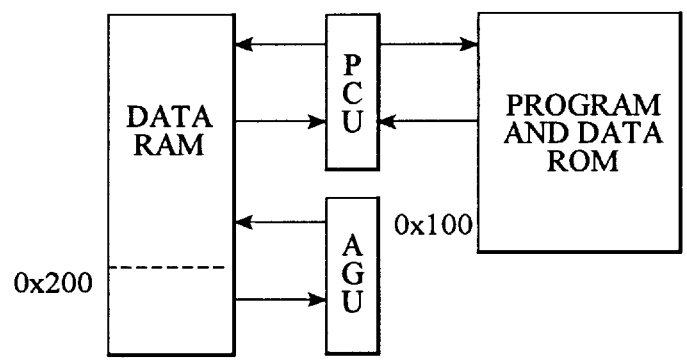
FIG. 7 is a block level diagram of an alternative Harvard architecture to which the improvement of the present invention is not useful.

FIG. 4 is a diagram of a five stage instruction pipeline in accordance with which the DSP of FIGS. 1 and 3 (including PCU 2 shown in and described with reference to FIG. 3) preferably executes a sequence of instructions from program memory 4. This pipeline is a "five stage" pipeline in the sense that five clock cycles (referred to as "fetch," "decode," "read," "execute," and "write" cycles) are required to execute one instruction. However, a new instruction can be received from program memory 4 every clock cycle, so that the effective number of clock cycles per instruction (averaged over many clock cycles) is one. The pipeline is implemented with a "register-memory" architecture, in the sense that an access of the data memory (memory 6) is part of an instruction. This is different from a "load-store" architecture, where a memory is accessed only with a move operation (e.g., specific "load" and "store" instructions).

During the first (Fetch) cycle of the pipeline, a word (which is typically an instruction) is fetched from program memory 4. The following description of the pipeline (with reference to FIG. 4) assumes that the word is an instruction, and the other case (in which the word is a data value) will be discussed following the description of FIG. 4. Also during the Fetch cycle, the instruction fetched from memory 4 is put into instruction register IR, and program counter register PC is updated with a new instruction address (which can be an incremented address asserted at the output of adder 18).

Then, during the Decode cycle of the pipeline, instruction decoding unit 20 receives and decodes the instruction in register IR, thereby generating control signals (control bits) for controlling execution of the instructions. Unit 20 stores the control signals in selected ones of instruction control registers cPCU, cACU, cMMU, cIOU, and cIRupt as follows: control bits for ACU 10 are stored in register cACU, control bits for memory management unit 3 (such as control bits src0, src1, and src2) are stored in register cMMU, control bits for PCU 2 are stored in register cPCU, control bits for IOU 12 are stored in register cIOU, and control bits for an interrupt controller (which is optionally included within IOU 12) are stored in register CIRupt. The control bits stored in the control registers (cPCU, cACU, cMMU, cIOU, and CIRupt) are transferred over lines not shown in FIG. 3 or FIG. 1 to their destinations (the control bits are not transferred over DB0 or DB1). Also, MMU 3 receives any control bits src0, src1, and/or src2 that are generated by unit 20, and MMU 3 decodes these control bits to generate address signals, so that MMU 3 can assert these address signals on address bus AB0 and/or address bus AB1 at the start of the next ("Read") cycle of the pipeline.

Then, during the Read cycle of the pipeline, data is read from one or two locations within data memory 6. The data read from one such location is written to register M0 (shown in FIG. 1), and the data read from the other location is written to register M1 (also shown in FIG. 1). Any post-modification of address signals to be performed by MMU 3 is also performed during the Read cycle. Any data values (in contrast with instructions) fetched from program memory 4 during the preceding "Fetch" are also pipelined to registers during the Read cycle, and then pipelined again (transferred to their appropriate destinations, such as to ACU 10 over bus DB0) during the Execute cycle.

Then, during the "Execute" cycle, computations are performed (typically by ACU 10) on the data values residing in the source registers of the units for performing such computations. For example, ACU 10 receives and processes data values from appropriate registers (e.g., registers LIM or SIM within PCU 2, or registers M0 or M1, or registers within ACU 10). The resulting processed data values are placed in appropriate registers (e.g., in accumulator registers within ACU 10).

Then, during the final ("Write") cycle, processed data values are written back to data memory 6. Optionally also, some post-processing such as post-shifting, is performed on the processed data values before they are written into memory 6.

With reference to PCU 2 of FIG. 3, we next describe several alternative methods in which data values stored in program memory 4 are fetched and pipelined in accordance with the invention. In accordance with the invention, PCU 2 can be programmed to implement one or more of these methods (each in response to a distinctive "program memory data" instruction of the type mentioned above).

After decoding unit 20 decodes one "program memory data" instruction written from program memory 4 to register IR, PCU 2 then treats the next N words (N is an integer equal to one or more, which is specified by the program memory data instruction) received from memory 4 as data values. In one preferred embodiment, PCU 2 passes these N words (data values) to a register (e.g., register LIMP, or another register) for later assertion to data bus DB0, and unit 20 then decodes the "N+1 th" word (e.g., the fifth word, in the case that N =4) received from memory 4 as an instruction (i.e., PCU 2 does not treat the "N+1 th" word received from memory 4 as a data value).

In response to another program memory data instruction, which indicates to unit 20 that the next word to be received from memory 4 is a data value, PCU 2 (under control of signals asserted by unit 20) writes this data value to data register LIM rather than to register IR. This can be accomplished as follows (where the program memory data instruction is decoded by unit 20 in the "Decode" cycle of an instruction pipeline, which is also the "Fetch" cycle of a subsequent word from program memory 4): unit 20 asserts a "Load LIM" instruction 20 to register IR during the Decode cycle to cause the data value to be written (during that Decode cycle) to register LIM rather than to register IR. Then, during the next cycle (the "Read" cycle of the program memory data instruction, which is also the Fetch cycle of the instruction following the data value asserted from memory 4 to register LIM), the data value in register LIM is written from register LIM to a pipeline register LIMP (shown in FIG. 3) and the next word (the new instruction) received from memory 4 is loaded into instruction register IR. Then, during the following cycle (the Decode cycle of the new instruction, which is also the Execute cycle of the program memory data instruction) the data value in the pipeline register LIMP is asserted from register LIMP to data bus DB0 (e.g., for processing in ACU 10) and the new instruction in instruction register IR is decoded by unit 20.

A sequence of several data values can be pipelined into register LIM and then register LIMP in response to a single program memory data instruction.

A third type of program memory data instruction received from program memory 4 has a portion which is itself a data value (called a "short immediate" or "SI"), which "fits" with the remaining portion of the instruction in register IR. When decoding this type of program memory data instruction, unit 20 writes the data value portion (SI) directly to register SIM (for assertion to data bus DB0), in addition to generating control bits from the remaining portion of the instruction. Unit 20 subsequently decodes the next word received in instruction register IR as another instruction. More specifically, in response to a program memory data instruction of this type, unit 20 writes the SI to register SIM and decodes the other portion of the program memory data instruction (both during a first "Decode" cycle) and the next word (a new instruction) received from memory 4 is written to instruction register IR (also during the first Decode cycle). Then (during the next cycle, the Read cycle associated with the program memory data instruction) SI is copied from register SIM to a pipeline register SIMP (shown in FIG. 3) and the new instruction in instruction register IR is decoded by unit 20. Then, during the following cycle (the Execute cycle associated with the program memory data instruction) SI is asserted from register SIMP to data bus DB0 (e.g., for processing in ACU 10).

Figure 5:
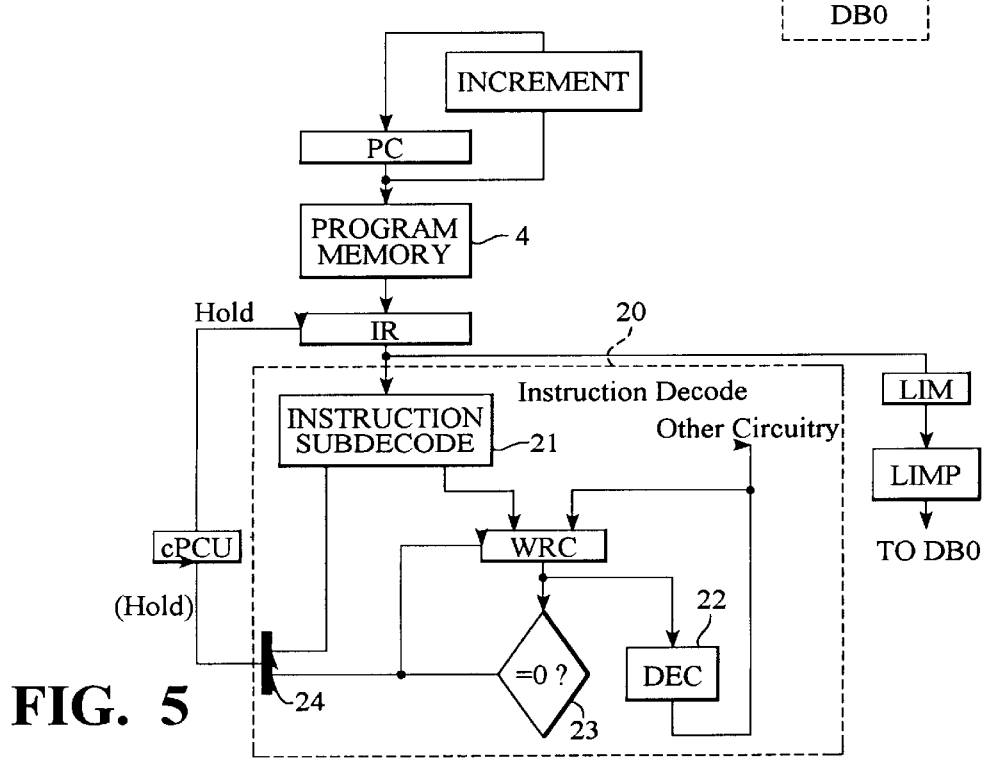
FIG. 5 is a schematic block level diagram of a preferred implementation of a portion of the program control unit of FIG. 3 (which is programmed to implement the invention).

Next, with reference to FIG. 5, we describe another class of methods in which data values stored in program memory 4 are fetched and pipelined in accordance with another embodiment of the invention. In this embodiment, PCU 2 includes hardware as shown in FIG. 5, and is programmed to assert data values (from program memory 4) repeatedly to data bus DB0 (i.e., to assert a sequence of different data values from memory 4, or to assert the same data value repeatedly) in response to a program memory data instruction denoted herein as a "repeat++" instruction. Such PCU 2 (including the hardware shown in FIG. 5) is preferably also programmed to implement a similar instruction (denoted herein as a "repeat" instruction) which is not a program memory data instruction. Both the "repeat" instruction and the "repeat++" instruction include bits which are indicative of a number (X) of repetitions of a subsequent instruction (i.e., the instruction to be loaded into register IR from program memory 4 immediately after the "repeat" or "repeat++" instruction).

In the embodiment shown in FIG. 5, decoding unit 20 of PCU 2 includes decoding logic circuit 21, register WRC, subtraction circuit 22, comparison logic 23, and signal selection circuit 24, connected as shown. In response to a "repeat" or a "repeat++" instruction received from register IR, circuit 21 decodes such instruction by: loading bits (e.g., a set of sixteen bits) indicative of X (the number of repetitions of the following instruction) into register WRC; and generating control bits (including control bits determining a "hold" signal) in response to the remaining portion of the "repeat" or a "repeat++" instruction. The hold signal is asserted from circuit 21 to circuit 24, and is asserted selectively from circuit 24 to register cPCU (depending on the nature of the signal output from circuit 23).

Once each clock cycle (of the described instruction pipeline), circuit 22 decrements (by one) the value stored in register WRC, and the decremented value is loaded into register WRC as a replacement for the current value. Also once during each clock cycle, the value stored in register WRC is compared with the value "zero" in comparison logic 23. If the value from register WRC is greater than zero, circuit 23 outputs a first signal to circuit 24 causing circuit 24 to assert the "hold" signal from circuit 21 to register cPCU. If the value from register WRC is equal to zero, circuit 23 outputs a second signal to circuit 24 causing circuit 24 to assert a default signal (other than the hold signal) from circuit 21 to register cPCU.

During each clock cycle at the start of which register cPCU stores the hold signal, the contents of registers PC and IR remain the same as in the previous clock cycle. During each clock cycle at the start of which register cPCU stores the default signal, register PC is updated with a new address and register IR is updated with a new word from program memory 4 (determined by the new address in register PC).

We next describe operations performed by a digital signal processor (of the type including an embodiment of PCU 2 which includes the hardware shown in FIG. 5) in response to the "repeat" or "repeat++" instruction asserted from program memory 4. Generally speaking, a "repeat" instruction does not cause PCU 2 to assert any data value from program memory 4 to data bus DB0, and does not instruct PCU 2 to fetch a data value (or an instruction including a data value portion) from program memory 4. In contrast, a "repeat++" instruction causes PCU 2 to assert sequentially to data bus DB0 at least two data values from program memory 4 (these data values can include a sequence of different values or a single value which is repeatedly asserted), and causes PCU 2 to fetch at least one data value (or at least one instruction including a data value portion) from program memory 4.

We next describe an example of the operations performed by a digital signal processor (of the type including an embodiment of PCU 2 which includes the hardware shown in FIG. 5) in response to a "repeat" instruction loaded into register IR from program memory 4. During the "Decode" cycle in which unit 20 decodes the repeat instruction, unit 20 writes the "repeat duration" portion (indicative of the number "X") of the repeat instruction to register WRC (and a new instruction is loaded from program memory 4 to register IR).

Then, during the next cycle (the "Read" cycle of repeat instruction, which is the Decode cycle of the "new" instruction following the repeat instruction), the new instruction in register IR (the instruction to be repeated) is decoded by unit 20 to generate control bits for executing the new instruction, and unit 20 asserts a hold signal to register cPCU (as a result of decoding the portion of the "repeat" instruction other than the repeat duration portion). During the same cycle, unit 20 asserts control bits to register cMMU (e.g., control bits src0, src1, or src2, which determine addresses for data values to be read from data memory 6 to execute the new instruction), MMU 3 receives and decodes these control bits to generate address signals, and MMU 3 asserts these address signals on address bus AB0 and/or address bus AB1 by the start of the next cycle. Also, the value stored in register WRC is compared with the value "zero" in comparison logic 23. Also, in response to the decremented value output from circuit 22 (and optionally in response to other control bits), unit 20 generates (and asserts to MMU 3) "post-increment" control bits for controlling post-incrementation (by MMU 3) of the address signals to be asserted on bus AB0 and/or bus AB1 during the next cycle.

During said next cycle (the Execute cycle of the repeat instruction, which is the Read cycle of the "new" instruction following the repeat instruction), the data values determined by the current address signals are read from data memory 6 and loaded into registers M0 and M1, and MMU 3 then increments these address signals (by amounts determined by the "postincrement" control signals previously received in MMU 3 from PCU 2). Also during this cycle, assuming that circuit 23 has determined in the previous cycle that the value in register WRC is greater than zero, decoder unit 20 responds in the same way as in the previous cycle to the "new" instruction (which remains in register IR), except as indicated in the following sentence. During this cycle the decremented value output from circuit 22 is different than in the previous cycle, so that unit 20 generates (and asserts to MMU 3) a different set of "post-increment" control bits for controlling post-incrementation (by MMU 3) of the address signals during the next cycle.

Then, during the next cycle (the Execute cycle associated with the "new" instruction), the data values in registers M0 and M1 are asserted to data bus DB0 (e.g., for processing in ACU 10, typically in accordance with control signals received in ACU 10 from PCU 2). Also during this cycle, different data values determined by the current address signals (which have been post-incremented in response to the first set of post-increment signals) are read from data memory 6 and loaded into registers M0 and M1, and MMU 3 then again post-increments the address signals (this time by amounts determined by the second set of "post-increment" control signals received in MMU 3 during the previous cycle from PCU 2). Also during this cycle, if circuit 23 has determined in the previous cycle that the value in register WRC is greater than zero, decoder unit 20 responds in the same way as in the previous cycle to the "new" instruction (which remains in register IR), and the repeat process continues in subsequent cycles. Otherwise, if circuit 23 has determined in the previous cycle that the value in register WRC is zero, the repeat process ends in the sense that decoder unit 20 responds to a different instruction (which has been loaded into register IR to replace the "new" instruction).

We next describe an example of the operations performed by a DSP (of the type including an embodiment of PCU 2 which includes the hardware shown in FIG. 5) in response to a "repeat++" instruction loaded into register IR from program memory 4.These operations differ from those (described above) performed in response to a "repeat" instruction in the following sense: the DSP processes data values from program memory 4 (and optionally also data values from data memory 6) in response to a "repeat++" instruction; but the DSP processes data values only from data memory 6 in response to a "repeat" instruction. In the following example, the instruction to be repeated (the instruction which follows the repeat++ instruction) may or may not itself include a portion (a set of bits) which determines a data value to be processed in ACU 10 in executing said instruction, and the instruction to be repeated is followed by a sequence of data values (each of which data values is to be processed in ACU 10 during one repetition of execution of the instruction).

In the example, the sequence of instructions and data values fetched from the program memory is as follows (where the text immediately following each symbol "→" indicates an operation performed by PCU 2 in response to the instruction or data value which immediately precedes the symbol):

repeat++N → execute next instruction N+1 times;
instruction → each execution of this instruction possibly includes data access to the data memory with post modification;
data value 0 → load this data value in LIM;
data value 1 → load this data value in LIM;
data value 2 → load this data value in LIM;
. . . .
data value N → load this data value in LIM; and
instruction → load this instruction in IR.

Thus, each of the "N+1" data values (following the instruction to be repeated) is loaded in register LIM. At the same time, the instruction to be repeated remains in the IR register and hence every cycle, unit 20 decodes the same instruction. This instruction can possibly include a data memory access to the data memory with a post modification. The result is that the instruction is the same, but that both data items, one coming from the program memory (typically a ROM) and one coming from the data memory (typically a RAM) are different from one cycle to the next.

A variation on the described repeat++ instruction is that the processor could load three (3) data items at the same time (during each cycle): two from the data memory and one from the program memory.

During the "Decode" cycle in which unit 20 decodes the repeat++ instruction, unit 20 writes the "repeat duration" portion (X) of the repeat++ instruction to register WRC, and asserts a hold signal to register cPCU (as a result of decoding the other non-data portion of the instruction).

Then, during the next cycle (the "Read" cycle of repeat++ instruction, which is the Decode cycle of the "new" instruction following the repeat++ instruction), the new instruction in register IR (the instruction to be repeated) is decoded by unit 20 to generate control bits for executing the new instruction, and unit 20 writes any data value portion of the new instruction to register SIM (usually, the new instruction will not include a data value portion). During the same cycle, a data value is fetched from program memory 4 and loaded into register LIM. Also during the same cycle, unit 20 also asserts control bits to register cMMU (e.g., control bits src0, src1, or src2, which determine the address or addresses for one or more data values to be read from data memory 6 to execute the "new" instruction), MMU 3 receives and decodes these control bits to generate address signals, and MMU 3 asserts these address signals on address bus AB0 and/or address bus AB1 by the start of the next cycle of the pipeline. Also, the value stored in register WRC is compared with the value "zero" in comparison logic 23. Also, in response to the decremented value output from circuit 22, unit 20 generates (and asserts to MMU 3) "post-increment" control bits for controlling post-incrementation (by MMU 3) of the address signals during the next cycle.

During said next cycle (the Execute cycle associated with the repeat++ instruction), the data value in register LIM (which was originally stored in program memory 4) is copied from register LIM to pipeline register LIMP (shown in FIG. 3), a new data value is loaded from program memory 4 into register LIM, the data value (or values) determined by the current address signal (signals) in MMU 3 is (are) read from data memory 6 and loaded into one or both of registers M0 and M1, and MMU 3 increments the address signal or signals (by amounts determined by the "post-increment" control signals previously received in MMU 3 from PCU 2). Also during this cycle, assuming that circuit 23 has determined in the previous cycle that the value in register WRC is greater than zero, decoder unit 20 responds in the same way as in the previous cycle to the "new" instruction (which remains in register IR), including by again writing any data value portion of the new instruction to register SIM, except that during this cycle the decremented value output from circuit 22 is different than in the previous cycle, so that unit 20 generates (and asserts to MMU 3) a different set of "post-increment" control bits for controlling post-incrementation (by MMU 3) of the address signal (or signals) during the next cycle. The "hold" control signal holds the "new" instruction in register IR, and ensures that a new data value is loaded from program memory 4 into register LIM. The program count PC increments during each cycle, and thus the current value of PC determines the data value to be loaded from program memory 4 into register LIM.

Then, during the following cycle (the Execute cycle associated with the "new" instruction following the repeat++ instruction), the data value in register LIMP (which is typically a coefficient) is asserted from register LIMP to data bus DB0 (e.g., to ACU 10, for processing in ACU 10, typically in accordance with control signals received in ACU 10 from PCU 2), a data value in register M0 or M1 is asserted to data bus DB1 (e.g., for processing in ACU 10 with the value from register LIMP, typically in accordance with control signals received in ACU 10 from PCU 2). When a data value is asserted from LIMP to bus DB0 at the same time a data value in register M0 (or M1) is to be asserted to a data bus, the latter data value (from M0 or M1) must be asserted on bus DB1 to avoid a conflict on bus DB0. Also during this cycle, a new set of one or more different data values determined by the current address signals (which may have been post-incremented in response to the first set of post-increment signals) are read from data memory 6 and loaded into one or both of registers M0 and M1, and MMU 3 then post-increments each address signal (this time by amounts determined by the second set of "post-increment" control signals received in MMU 3 during the previous cycle from PCU 2). Also during this cycle, if circuit 23 has determined in the previous cycle that the value in register WRC is greater than zero, decoder unit 20 responds in the same way as in the previous cycle to the "new" instruction (which remains in register IR) including by copying the current data value in register LIM to register LIMP, and the repeat++ process continues in subsequent cycles. Otherwise, if circuit 23 has determined in the previous cycle that the value in register WRC is zero, the repeat++ process ends in the sense that decoder unit 20 responds to a different instruction (which has been loaded into register IR to replace the "new" instruction).

The methods implemented by the described apparatus are within the scope of the invention.

Preferred embodiments of the method and system of the invention, and several variations thereon, have been described with reference to FIGS. 1 and 35. Although these embodiments have been described in some detail, it is contemplated that many changes from (and variations on) these embodiments can be made without departing from the spirit and scope of the invention as defined by the appended claims.

What is claimed is:

1. A digital signal processing system, having a true Harvard architecture, for executing instructions and thereby processing data, said system including:

a program memory which stores the instructions and a first portion of the data comprising first data values;

a data memory which stores a second portion of the data comprising second data values, wherein the data memory is physically separate from the program memory;

processing means for processing those of the first data values and the second data values asserted thereto;

program control means for receiving a sequence of the instructions from the program memory and generating control signals for controlling execution of the instructions in said sequence, wherein the program control means includes means for fetching and loading into a first register of the program control means at least one of the first data values from the program memory in response to at least one of the instructions in said sequence and subsequently asserting said at least one of the first data values from said first register to the processing means; and a memory management means, connected to the program control means and the data memory, for receiving at least one of the control signals from the program control means and generating address signals for the data memory in response to said at least one of the control signals for controlling assertion of at least one of the second data values from the data memory to the processing means.

2. The system of claim 1 wherein said data memory does not include any read only memory.

3. The system of claim 1, wherein the program control means includes means for asserting a sequence of the first data values from the program memory to the processing means in response to said one of the instructions.

4. The system of claim 1 wherein said program memory is a read only memory.

5. The system of claim 1, wherein the control signals control execution by the system of the instructions in said sequence in a pipelined manner.

6. The system of claim 5, wherein the control signals control execution of the instructions in said sequence in accordance with a five stage instruction pipeline.

7. The system of claim 1, wherein the program control means includes means for sequentially fetching at least two of the first data values from the program memory in response to one of the instructions in said sequence.

8. A method for controlling operation of a digital signal processing system for executing instructions and thereby processing data, said system having a true Harvard architecture and including a program memory which stores the instructions and a first portion of the data comprising first data values and a data memory which stores a second portion of the data comprising second data values, wherein the data memory is physically separate from the program memory with separate access thereto, said method including the steps of:

(a) receiving a sequence of the instructions from the program memory and generating control signals for controlling execution of the instructions in said sequence; and (b) fetching and loading into a program memory data register at least one of the first data values from the Program memory in response to one of the instructions in said sequence, and subsequently asserting said at least one of the first data values from said program memory data register to the processing means.

9. The method of claim 8, also including the step of:

asserting at least one of the control signals to a memory management means connected to the data memory, and generating address signals for the data memory in response to said at least one of the control signals for controlling assertion of at least one of the second data values from the data memory to the processing means.

10. The method of claim 8, wherein step (b) includes the step of:

successively asserting a sequence of plural first data values from the program memory to the processing means in response to said one of the instructions.

11. The method of claim 8, also including the step of:
controlling execution of the instructions in said sequence in a pipelined manner in response to the control signals.

12. The method of claim 11, also including the step of:
controlling execution of the instructions in said sequence in accordance with a five stage instruction pipeline in response to the control signals.

13. The method of claim 8 wherein step (b) includes the step of:
sequentially fetching at least two of the first data values from the program memory to a program memory data register in response to one of the instructions in said sequence and subsequently asserting said first data values to said processing means.

14. A digital signal processing system, for executing instructions and thereby processing data, said system including:
a program memory which stores the instructions and a first portion of the data comprising first data values;
a data memory which stores a second portion of the data comprising second data values, wherein the data memory is physically separate from the program memory;
processing means for processing those of the first data values and the second data values asserted thereto;
instruction retrieval means for addressing the program memory only, and for receiving a sequence of the instructions therefrom;
data retrieval means for addressing the data memory only, and for receiving the second data values therefrom; and
program control means for fetching and loading into the first register of the program control means at least one of the first data values from the program memory in response to at least one of the instructions in said sequence and subsequently asserting said at least one of the first data values from said first register to the processing means and for generating control signals for controlling execution of the instructions in said sequence retrieved from said program memory.

15. A method for controlling operation of a digital signal processing system for executing instructions and thereby processing data, said system including a program memory which stores the instructions and a first portion of the data comprising first data values, a data memory which stores a second portion of the data comprising second data values, wherein the data memory is physically separate from the program memory with separate access thereto, a processing means for processing those of the first data values and the second data values asserted thereto; an instruction retrieval means for addressing the program memory only, and for receiving a sequence of the instructions therefrom; a data retrieval means for addressing the data memory only, and for receiving the second data values therefrom; said method including the steps of:

(a) receiving, in an instruction register, one of the instructions in the sequence during a first pipeline cycle; and
receiving, in the instruction register, a second one of the instructions of the sequence during a second pipeline cycle.

(b) loading, into a second register from the Program memory, one of the first data values during a third pipeline cycle in response to signals including a hold signal generated in response to said one of the instructions; and
loading, into the second register from the program memory, a second one of the first data values during a fourth pipeline cycle inn response to signals including said hold signal; and (c) processing said first and second retrieved data values by said processing means.

16. The method of claim 15, wherein step (b) includes the steps of:
retrieving one of the second data values from the data memory during a pipeline cycle following said third pipeline cycle, in response to signals including at least one control signal generated in response to said second one of the instructions.

17. A digital signal processing system, having a true Harvard architecture, for executing instructions and thereby processing data, said system comprising:
a program memory which stores the instructions and a first portion of the data comprising first data values;
a data memory which stores a second portion of the data comprising second data values, wherein said data memory is physically separate from the program memory and accessible via separate address and data buses from those for said program memory, whereby the program memory and data memory define completely separate memory spaces;
processing means for processing those of the first data values from said program memory and the second data values from said data memory that are asserted thereto;
program control means for receiving a sequence of the instructions from the program memory and generating control signals for controlling execution of the instructions in said sequence, said program control means including
(i) means for addressing the program memory only,
(ii) an instruction register for receiving the sequence of instructions from the program memory,
(iii) instruction decoding means for receiving the sequence of instructions from the instruction register and generating said control signals in response to said instructions in said sequence, and
(iv) at least one program memory data register for receiving at least one of the first data values from the program memory and asserting said first data values to said processing means in response to at least one of the instructions in said sequence, said control signals determining whether an instruction is loaded into said instruction register or a first data value is loaded into one said program memory data register; and
data memory management means for controlling assertion of second data values from said data memory to said processing means, said data memory management means including
(i) means for addressing the data memory only, said addressing means connected to said instruction decoding means of said program control means for receiving at least one of the control signals therefrom and generating address signals for said data memory in response to said control signals, and
(ii) at least one data memory register connected to said data memory for receiving at least one of the second data values from the data memory in response to said generated address signals and asserting said second data values to said processing means.

18. The system of claim 17 wherein at least one said instruction includes a data value portion therewith, said instruction decoding means separating said data value portion from said instruction and placing said data value portion in one said program memory data register for assertion to said processing means.

19. The system of claim 17 wherein at least one said instruction indicates that a next word from said program memory is a first data value, said instruction decoding means generating control signals that direct said first data value retrieved from said program memory into one said program memory data register for assertion to said processing means.

20. The system of claim 17 wherein at least one said instruction indicates that a plurality N of next words from said program memory are first data values, said instruction decoding means generating control signals that sequentially direct said N first data values retrieved from said program memory into one said program memory data register for successive assertion to said processing means.

21. The system of claim 17 wherein at least one said instruction indicates that a next instruction is to be executed repeatedly a plurality X number of times, said instruction decoding means having a repeat counter therein, means for initially loading said number X into said repeat counter, means for repeatedly decrementing said repeat counter, and means for comparing said number in said repeat counter with zero, said instruction decoding means generating control signals that load said next instruction from said program memory into said instruction register, that then direct X first data values sequentially retrieved from said program counter into one said program memory data register for successive assertion to said processing means, and that cause repeated execution of said instruction in said instruction register by said processing means for X times.

22. A method for controlling operation of a digital signal processing system for executing instructions and thereby processing data, said system including (i) a program memory which stores the instructions and also a first portion of the data comprising first data values, (ii) a data memory which stores a second portion of the data comprising second data values, wherein said data memory is physically separate from the program memory and accessible via separate address and data buses from those for said program memory, whereby the program memory and data memory define completely separate memory spaces, (iii) processing means for processing those of the first data values from the program memory and the second data values from the data memory that are asserted thereto, (iv) program control means for receiving a sequence of the instructions from the program memory and generating control signals for controlling execution of the instructions in said sequence, and also for retrieving first data values from said program memory and asserting said first data values to said processing means, and (v) data memory management means for retrieving second data values from said data memory and asserting said second data values to said processing means; said method comprising the steps of:

(a) addressing the program memory by said program control means and receiving one of the instructions in said sequence from said program memory by an instruction register of said program control means;

(b) decoding said instruction stored in said instruction register and generating said control signals in response to said decoded instruction for controlling execution of that instruction;

(c)(1) addressing said data memory by said data memory management means in response to at least one of the control signals generated by said program control means and receiving at least one second data value from said data memory by at least one data memory register of said data memory management means, and (2) for at least one instruction in said sequence, addressing said program memory by said program control means in response to at least one of the control signals generated in response to that instruction and sequentially receiving at least one first data value from said program memory by a program memory data register of said program control means;

(d) asserting said at least one second data value from said at least one data memory register and, for said at least one instruction, sequentially asserting said at least one first data value from said program memory data register, to said processing means and processing said asserted first and second data values by said processing means in response to said control signals in accord with said one of the instructions in said sequence; and (e) repeating steps (a)–(d) in a pipelined manner for the sequence of said instructions.

23. The method of claim 22 wherein at least one instruction includes a data value portion therewith, said decoding of that instruction in step (b) separating said data value portion therefrom and placing said data value portion into a program memory data register of said program control means for subsequent assertion to said processing means.

24. The method of claim 22 wherein at least one instruction indicates that a next word from said program memory is a first data value, said control signals generated in step (b) in response to that instruction causing addressing of said program memory to receive said first data value therefrom by said program memory data register in step (c)(2).

25. The method of claim 22 wherein at least one instruction indicates that a plurality N of next words from said program memory are first data values, said control signals generated in step (b) in response to that instruction causing successive addressing of said program memory in N repeats of step (c)(2) to sequentially receive said N first data values by said program memory data register for successive assertion of said first data values to said processing means.

26. The method of claim 22 wherein at least one instruction indicates that a next instruction is to be executed repeatedly a plurality X number of times, said control signals generated in step (b) in response to that one instruction causing said number X to be loaded into a repeat counter and successively decremented to zero, said next instruction to be loaded into said instruction register and held there by a hold signal until said repeat counter is zero, X first data values to be sequentially retrieved from said program memory into said program memory data register for successive assertion to said processing means, and said instruction held in said instruction register to be executed X times with said asserted first data values.

27. The method of claim 22 wherein at least one instruction indicates that a result of executing said instruction is to be loaded back into said data memory, said control signals generated in step (b) in response to that instruction causing said data memory management means to address said data memory and said processing means to write said result to said addressed data memory in a further pipeline step (d)(2) following said processing of said data values.

* * * * *